United States Patent [19]

Betso et al.

[11] Patent Number: 4,855,404

[45] Date of Patent: Aug. 8, 1989

[54] PROCESS AND EQUIPMENT FOR PROCESSING THERMOPLASTIC POLYMERS

[75] Inventors: Stephen R. Betso; Kun S. Hyun, both of Midland; Patrick M. Russell, Freeland, all of Mich.

[73] Assignee: The Dow Chemical Company, Midland, Mich.

[21] Appl. No.: 167,762

[22] Filed: Mar. 14, 1988

Related U.S. Application Data

[63] Continuation-in-part of Ser. No. 822,717, Jan. 27, 1986, abandoned.

[51] Int. Cl.$^4$ ................................................ C08F 6/00
[52] U.S. Cl. ............................... 528/502; 264/211.21; 264/176.1; 264/337; 425/461; 528/503
[58] Field of Search .................. 264/337, 338, 176 R; 249/134; 148/6 B; 528/480, 481, 502, 503; 425/461, 462, 463, 467

[56] References Cited

U.S. PATENT DOCUMENTS 3,271,822  9/1966  Rhino ................................. 425/461
4,167,386  9/1979  Mallay ................................ 425/463

Primary Examiner—Christopher Henderson
Attorney, Agent, or Firm—Thomas D. Zindrick; Bruce M. Kanuch

[57] ABSTRACT

A method and equipment for processing a thermoplastic polymer wherein at least a portion of the surfaces which contact the thermoplastic polymer, while said thermoplastic polymer is in a heat plastified state, comprise boron carbide.

16 Claims, No Drawings

PROCESS AND EQUIPMENT FOR PROCESSING THERMOPLASTIC POLYMERS

This application is a continuation-in-part of copending application Ser. No. 822,717 filed Jan. 27, 1986, now abandoned.

BACKGROUND OF THE INVENTION

This invention concerns a process and equipment for melt processing a thermoplastic polymer. Specifically, the invention concerns a process and equipment for melt processing a thermoplastic polymer wherein a portion of the surfaces which contact the thermoplastic polymer, while said thermoplastic polymer is in a heat plastified state, comprises boron carbide.

Methods and equipment for melt processing thermoplastic polymers are well-known in the prior art. Typically, such methods and equipment involve passing the heat plastified thermoplastic polymer through processing equipment, the surfaces of which comprise a metal or metal alloy.

In those cases wherein the thermoplastic polymer contains a halogen, passing the heat plastified halogen containing thermoplastic polymer over certain metal surfaces is known to lead to dehydrohalogenation within the polymer. For example, in the processing of vinylidene chloride interpolymers, contacting the heat plastified vinylidene chloride interpolymer against a surface containing iron has been found to lead to the rapid dehydrohalogenation and subsequent decomposition of the vinylidene chloride interpolymer.

Moreover, it is also known that certain thermoplastic polymers while in a heat plastified state adhere to certain metal or metal alloy surfaces. Adhesion between the heat plastified polymers and the metal or metal alloy surfaces of equipment used to process said polymers is undesirable. Adhesion between the heat plastified thermoplastic polymer and the metal or metal alloy surfaces of the processing equipment cause portions of the thermoplastic polymer to remain within the processing equipment for undesirable periods of time. The longer a thermoplastic polymer remains within the processing equipment while in a heat plastified state the more likely said thermoplastic polymer is to experience detrimental effects caused by heat. Additionally, adhesion between the heat plastified thermoplastic polymer and the processing equipment tends to make movement of the heat plastified thermoplastic polymer through said processing equipment more difficult.

Recognition of these problems has caused a great deal of research to be done in determining which metal or metal alloys are best suited for processing particular thermoplastic polymers. Often, it has been found that particular thermoplastic polymers process best on metal or metal alloy surfaces which metal or metal alloy surfaces are expensive to produce or difficult to fabricate. For example, vinylidene chloride interpolymers have been found to process best on highly polished metal surfaces which surfaces comprise an alloy of nickel.

It is desirable to find a material suitable for processing thermoplastic polymers which material is relatively inexpensive, easy to fabricate, and avoids the problems of adhesion and decomposition discussed above. It is to this goal that the present invention is directed.

SUMMARY OF THE INVENTION

The present invention concerns a method of processing a thermoplastic polymer wherein at least a portion of the surfaces which contact the thermoplastic polymer, while said thermoplastic polymer is in a heat plastified state, comprise boron carbide.

Additionally, the present invention concerns equipment for processing a heat plastified thermoplastic polymer, said equipment having surfaces which contact the heat plastified thermoplastic polymer wherein at least a portion of the surfaces which contact the heat plastified thermoplastic polymer comprise boron carbide.

DETAILED DESCRIPTION OF THE INVENTION

Polymers (homopolymers and interpolymers) suitable for use in the present invention include all thermoplastic polymers which undergo a heat plastification step during their processing. Desirably, those thermoplastic polymers which are best served by the present invention are those thermoplastic polymers which contain halogen. This is because halogen containing thermoplastic polymers often dehydrohalogenate during processing steps in which they are heat plastified. The present invention markedly decreases the amount of dehydrohalogenation which occurs in the processing of halogenated polymers. Exemplary of thermoplastic polymers desirable for use in the present invention are homopolymers and interpolymers of vinylidene chloride, homopolymers and interpolymers of vinyl chloride, chlorinated polyethylene, and chlorinated polyvinyl chloride.

Beneficially, the thermoplastic polymer is a vinylidene chloride interpolymer. The vinylidene chloride interpolymer is typically formed from a monomer mixture comprising an amount of vinylidene chloride and an amount of at least one monoethylenically unsaturated monomer copolymerizable therewith. The amount of vinylidene chloride present in the monomer mixture is suitably from about 40 to about 98 percent, based on total weight of vinylidene chloride interpolymer, beneficially from about 50 to about 96 weight percent based on total weight of the vinylidene chloride interpolymer, and desirably from about 60 to about 94 weight percent based on total weight of the vinylidene chloride interpolymer.

The vinylidene chloride interpolymer comprises one or more monoethylenically unsaturated monomers which are copolymerizable with the vinylidene chloride. The amount of monoethylenically unsaturated monomer present in the monomer mixture from which the vinylidene chloride interpolymer is formed is suitably from about 60 to about 2 weight percent based on total weight of the vinylidene chloride interpolymer, beneficially from about 50 to about 4 weight percent based on total weight of the vinylidene chloride interpolymer, and desirably from about 40 to about 6 weight percent based on total weight of the vinylidene chloride interpolymer.

Monoethylenically unsaturated monomers copolymerizable with the vinylidene chloride include but are not limited to, vinyl chloride, alkyl acrylates, alkyl methacrylates, acrylic acid, methacrylic acid, itaconic acid, acrylonitrile, and methacrylonitrile. The ethylenically unsaturated monomers are desirably selected from the group consisting of vinyl chloride, alkyl acrylates, and alkyl methacrylates, the alkyl acrylates and alkyl methacrylates having from about 1 to about 8 carbon atoms per alkyl group. The alkyl acrylates and alkyl methacrylates beneficially have from about 1 to about 4 carbon atoms per alkyl group. The alkyl acrylates and alkyl methacrylates are preferably selected from the group consisting of methyl acrylates, ethyl acrylates, and methyl methacrylates.

Other thermoplastic polymers desirable for use in the present invention include homopolymers and interpolymers of vinyl chloride and chlorinated polyethylene.

According to the process of the present invention, at least a portion of the surfaces which contact the thermoplastic polymer, while said thermoplastic polymer is in a heat plastified state, comprise boron carbide. A surface which comprises boron carbide has been found to produce substantially less dehydrohalogenation in heat plastified polymers than certain metal or metal alloy surfaces. That is, while certain metal and metal alloy surfaces have been found to catalyze dehydrohalogenation in heat plastified thermoplastic polymers, boron carbide appears to have a generally noncatalytic effect with respect to dehydrohalogenation of heat plastified thermoplastic polymers. Additionally, boron carbide surfaces have been found to have an exceptionally low degree of adhesion to certain thermoplastic polymers. One polymer to which boron carbide has a low degree of adhesion is a vinylidene chloride homopolymer or interpolymer having the composition hereinbefore described.

Methods of producing boron carbide are well-known in the prior art. Any method which produces boron carbide is suitable for use in producing the boron carbide of the present invention. Boron carbide is most commonly produced by the reduction of boric oxide with carbon at a temperature between 1400°–2300° C. In the presence of carbon, magnesium reduces boric oxide to boron carbide at 1400°–1800° C.

For the purposes of this invention, it is only necessary that at least a portion of the surfaces which contact the thermoplastic polymer, while said thermoplastic polymer is in a heat plastified state, comprise boron carbide. Exemplary of surfaces which contact the thermoplastic polymers while said thermoplastic polymers are in a heat plastified state are the internal surfaces of extruders (e.g. the interior surfaces of extruder barrels, the outer surface of extruder screws, etc.); the interior surfaces of extrusion dies; the feed ports; the interior surfaces of transfer lines; etc.

For the purposes of this application, the term "heat plastified" when used in connection with the thermoplastic polymers refers to thermoplastic polymers wherein a portion of said thermoplastic polymer has been heated to a temperature which is equal to or above the softening point of said thermoplastic polymer if said polymer has a softening point or which is within or above the softening range of said thermoplastic polymer if said polymer has a softening range.

It is possible to form an entire piece of equipment out of boron carbide or, alternatively, it is possible to coat a substrate with boron carbide and achieve essentially the same desirable results. For example, in the case of an extruder screw, it is possible to form the entire screw from boron carbide, or it is possible to coat a metal or metal alloy extruder screw with a layer of boron carbide. If boron carbide is to be coated on a metal or metal alloy substrate, the higher the degree of coverage the more benefit one will see in terms of reducing dehydrohalogenation of the thermoplastic polymer. That is to say, when compared to an uncoated extruder screw, 50 percent coverage of a metal or metal alloy extruder screw will produce a somewhat lower degree of dehydrohalogenation in the thermoplastic polymer whereas 90 percent coverage of the same extruder screw will produce a still lower degree of dehydrohalogenation. Typically, in the case where boron carbide is coated on a metal or metal alloy substrate it is desirable to have from about 10 to about 100 percent coverage of the metal or metal alloy substrate, preferably from about 50 to about 100 percent coverage.

When particular items such as extruder screws, extruder barrels, dies, etc. are to be formed entirely of boron carbide, it has been found useful to blend the boron carbide with one or more derivatives of boron carbide.

For the purposes of this invention, the phrase "derivatives of boron carbide" refers to boron and carbide derivatives of transition elements such as those derivatives formed by blending boron carbide and a transition element at a temperature sufficient to cause the decomposition of boron carbide and the subsequent formation of said derivatives. Desirably, the transition element is selected from the group consisting of titanium, vanadium, and niobium. Beneficially, the transition element is titanium. The presence of one or more derivatives of boron carbide has been found to render the fabrication of equipment for use in processing thermoplastic polymers according to the present invention easier.

The derivatives of boron carbide are present in the blend of boron carbide and one or more derivatives of boron carbide in an amount of from about 0.5 to about 25 weight percent, based on total weight of the blend. Desirably, the derivatives of boron carbide are present in the blend of boron carbide and one or more derivatives of boron carbide in an amount of from about 3 to about 15 weight percent, preferably from about 3 to about 7 weight percent based on total weight of the blend.

The blend of boron carbide and one or more derivatives of boron carbide can be formed by (1) adding preformed derivatives to boron carbide, or (2) forming the derivatives of boron carbide in-situ. The formation of derivatives of boron carbide in-situ is accomplished by adding a transition element to an amount of boron carbide and blending the resultant mixture at a temperature sufficient to cause the decomposition of boron carbide and subsequent formation of said derivatives. The boron carbide and transition element are blended in a ratio such that upon completion of the in-situ formation of the derivatives of boron carbide said derivatives are present in the blend of boron carbide and one or more derivatives of boron carbide in the amounts set forth above.

When the derivatives of boron carbide are formed in-situ such that said derivatives are present in the blend of boron carbide and one or more derivatives of boron carbide in an amount as set forth above, the amount of transition element added to the boron carbide is such that essentially all of the transition element reacts with boron carbide to form derivatives of boron carbide. Nonetheless, it is possible that some of the transition element remains in the blend in its unreacted form.

Blending of the boron carbide and a transition element can be accomplished by attrition milling, ball milling, or other shear/milling action.

Any equipment useful in processing heat plastified thermoplastic polymers can be manufactured to have at least a portion of the surfaces which contact the thermoplastic polymer, while said thermoplastic polymer is in a heat plastified state, comprise boron carbide. Exemplary of processing equipment which is desirably manufactured so that at least a portion of the surfaces which contact the thermoplastic polymer, while said thermoplastic polymer is in a heat plastified state, comprise boron carbide are extruders, extrusion dies, feed ports, transfer lines, and the like. In the case wherein an extruder is to be manufactured so that at least a portion of the surfaces of the extruder which contact the thermoplastic polymer, while said thermoplastic polymer is in a heat plastified state, comprise boron carbide, it is often desirable to have the interior surfaces of the barrel, the exterior surfaces of the screws, and the like, comprise boron carbide.

The Following examples are meant to be illustrative only and are not intended to limit, in any way, the scope of the invention is set forth in the claims.

EXAMPLES

For all the examples the following test procedure is employed.

A steam heated hydraulic press is employed. The press is pre-heated to about 170°–175° C. Pellets of a vinylidene chloride/vinyl chloride copolymer (80/20) are placed on the material to be tested. The pellets are covered with a polyethylene terephthalate film which is in turn covered with a polished metal platen. The specimen thus formed is placed in the press and pre-heated for 5 minutes. Ten thousand pounds per square inch of pressure is then applied to the specimen. The pressure is maintained for five minutes. After five minutes the pressure is reduced and the specimen removed from the press. The color of the vinylidene chloride/vinylchloride copolymer is immediately checked as is the releasability of the copolymer from the material to be tested. This is the hot release determination. The specimen is allowed to cool to room temperature and the releasability of the copolymer from the material to be tested is again determined. This is the cold release determination.

EXAMPLE 1

A test specimen of boron carbide is prepared. The test specimen is in the form of a plate 7 inches × 6 inches × 1 inch. The plate is formed by hot pressing the boron carbide at 2250° C. for 3½ hours at a pressure of 485 pounds per square inch.

The test procedure set forth above is performed employing the boron carbide test plate. The results are set forth in Table I.

EXAMPLE 2

A test specimen of boron carbide and titanium is prepared. The boron carbide and titanium (10 weight percent titanium based on total weight of test specimen) are ball milled together, for 10 hours, to form a homogenous mixture. The mixture is placed into a die and green compacted at 12,500 pounds per square inch. The die is in the form of a circular plate, 2 inches in diameter having a thickness of ¼ inch. The green compacted mixture is then sintered at 2350° C. for 2½ hours, and hot pressed at 2,250° C. for 3½ hours at a pressure of 485 pounds per square inch.

The test procedure set forth above is performed employing the test plate. The results are set forth in Table I.

EXAMPLE 3

A test specimen of boron carbide and epoxy is formed. The test specimen comprises 60 weight percent boron carbide and 40 weight percent epoxy, based on total weight of test specimen. The boron carbide is in powder form and has a bimodal particle size distribution. One group of particles has an average diameter of about one micron, the other group of particles has an average diameter of about ten microns. The epoxy is Dow Epoxy 3031 commercially available from The Dow Chemical Company, Midland, Mich. The boron carbide and epoxy are physically mixed together to form a suspension mixture. The mixture is coated on a steel plate. The steel plate is 4 inches by 6 inches and is coated to a thickness of 0.1 inch. The coated steel plate is then cured at room temperature for 12 hours.

The test procedure set forth above is performed using the test plate. The results are set forth in Table I.

TABLE I

| Example No. | Inertness[1] | Hot Release | Cold Release |
|---|---|---|---|
| 1 | Excellent | Excellent | Excellent |
| 2 | Excellent | Excellent | Excellent |
| 3 | Excellent | Excellent | Excellent |

[1]Evaluated on the amount of discoloration in the vinylidene chloride/vinyl chloride copolymer.

As can be seen from the above results, all test specimens form surfaces which function exceptionally well in melt processing thermoplastic polymers.

What is claimed is:

1. A method of melt processing a thermoplastic polymer, comprising processing the thermoplastic polymer through processing means having surfaces which contact the thermoplastic polymer, while said thermoplastic polymer is in a heat plastified state, wherein at least 50% of said surfaces which contact the thermoplastic polymer comprises boron carbide.

2. The method of claim 1 wherein the thermoplastic polymer is a halogen containing thermoplastic polymer.

3. The method of claim 2 wherein the halogen containing thermoplastic polymer is formed from a monomer mixture which comprises vinylidene chloride and at least one other ethylenically unsaturated monomer copolymerizable therewith.

4. The method of claim 3 wherein the ethylenically unsaturated monomer copolymerizable with vinylidene chloride is selected from the group consisting of vinyl chloride, alkyl acrylates, alkyl methacrylates, acrylic acid, methacrylic acid, itaconic acid, acrylonitrile, and methacrylonitrile.

5. The method of claim 2 wherein the ethylenically unsaturated monomer copolymerizable with the vinylidene chloride is selected from the group consisting of vinyl chloride, methyl acrylate, and methyl methacryl 6. The method of claim 2 wherein the halogen containing thermoplastic resin comprises vinyl chloride.

7. The method of claim 2 wherein the halogen containing thermoplastic resin comprises chlorinated polyethylene.

8. The method of claim 1 wherein the processing means comprises an extruder.

9. The method of claim 1 wherein the processing means comprises a die.

10. The method of claim 1 wherein at least a portion of the surfaces which contact the thermoplastic resin, while said thermoplastic resin is in a heat plastified state, comprise a blend of boron carbide and one or more derivatives of boron carbide.

11. The method of claim 10 wherein the derivatives of boron carbide are formed from a transition element selected from the group consisting of titanium, vanadium, and niobium.

12. The method of claim 11 wherein the transition element is titanium.

13. The method of claim 10 wherein the derivatives of boron carbide are present in the blend of boron carbide and one or more derivatives of boron carbide in an amount of from about 0.5 to about 25 weight percent based on total weight of the blend.

14. The method of claim 13 wherein the derivatives of boron carbide are present in the blend of boron carbide and one or more derivatives of boron carbide in an amount of from about 3 to about 15 weight percent based on total weight of the blend.

15. The method of claim 14 wherein the derivatives of boron carbide are present in the blend of boron carbide and one or more derivatives of boron carbide in an amount of from about 3 to about 7 weight percent based on total weight of the blend.

16. Melt processing means for processing a thermoplastic polymer, said processing means comprises surfaces which contact the thermoplastic polymer, while said thermoplastic polymer is in a heat plastified state, wherein at least 50% of said surfaces comprise boron carbide.

* * * * *